(12) United States Patent
Tanaka et al.

(10) Patent No.: US 11,650,529 B2
(45) Date of Patent: May 16, 2023

(54) IMAGE FORMING APPARATUS

(71) Applicants: Tomoya Tanaka, Kanagawa (JP); Taisuke Ishikawa, Kanagawa (JP)

(72) Inventors: Tomoya Tanaka, Kanagawa (JP); Taisuke Ishikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/811,996

(22) Filed: Jul. 12, 2022

(65) Prior Publication Data

US 2023/0029299 A1 Jan. 26, 2023

(30) Foreign Application Priority Data

Jul. 20, 2021 (JP) .............................. JP2021-119450

(51) Int. Cl.
*G03G 15/00* (2006.01)
*G03G 21/20* (2006.01)

(52) U.S. Cl.
CPC ......... *G03G 15/5008* (2013.01); *G03G 15/55* (2013.01); *G03G 21/20* (2013.01); *G03G 21/206* (2013.01)

(58) Field of Classification Search
CPC ............... G03G 15/50; G03G 15/5008; G03G 15/5012; G03G 15/55; G03G 15/2039; G03G 15/205; G03G 21/20
See application file for complete search history.

(56) References Cited

U.S. PATENT DOCUMENTS

| 2007/0212083 | A1* | 9/2007 | Ishikuro ............. G03G 15/5008 399/167 |
| 2014/0233972 | A1 | 8/2014 | Sugiyama et al. |
| 2016/0274522 | A1* | 9/2016 | Yamamoto ............. G03G 21/20 |
| 2020/0021707 | A1* | 1/2020 | Kojima ................. G03G 15/043 |
| 2020/0103823 | A1 | 4/2020 | Tanaka et al. |
| 2021/0096508 | A1 | 4/2021 | Ishikawa et al. |
| 2021/0096509 | A1 | 4/2021 | Ishikawa et al. |
| 2021/0364943 | A1* | 11/2021 | Otana ................... G03G 15/043 |
| 2022/0179340 | A1* | 6/2022 | Arata ................. G03G 15/2046 |

FOREIGN PATENT DOCUMENTS

| JP | 2007-286579 | 11/2007 |
| JP | 2013-225108 | 10/2013 |
| JP | 2014-157266 | 8/2014 |
| JP | 2017-111241 | 6/2017 |

* cited by examiner

*Primary Examiner* — Carla J Therrien
(74) *Attorney, Agent, or Firm* — IPUSA, PLLC (57) ABSTRACT

An image forming apparatus includes an image forming device, a driving device, an external temperature detector, an internal temperature detector, a work amount detector, and control circuitry. When a temperature detected by the external temperature detector is lower than a temperature threshold, the circuitry shifts to a first restriction state based on a work amount and temporarily stops drive of the image forming device for a period every time the amount reaches a threshold. When the temperature is not lower than the temperature threshold, the circuitry shifts to a second restriction state based on an internal temperature. In the second state, in a case where the internal temperature is higher than a first threshold, the circuitry performs an intermittent operation of repeating a pause state and a printing state, until the internal temperature falls to be equal to or lower than a second threshold being lower than the first threshold.

6 Claims, 10 Drawing Sheets

IMAGE FORMING APPARATUS

CROSS-REFERENCE TO RELATED APPLICATIONS

This patent application is based on and claims priority pursuant to 35 U.S.C. § 119(a) to Japanese Patent Application No. 2021-119450, filed on Jul. 20, 2021, in the Japan Patent Office, the entire disclosure of which is hereby incorporated by reference herein.

BACKGROUND

Technical Field

Embodiments of the present disclosure relate to an image forming apparatus.

Related Art

In an image forming apparatus, there is a technology of restricting a printing operation in a case where a print quality is affected.

For example, there has been proposed a technology of detecting temperature inside or around a developing device that changes in accordance with temperature of a developer carrier, controlling restriction of the number of pages on which image may be continuously formed and release of the restriction on the basis of a detection result, and notifying of time information at which an operation of restricting the number of pages on which the image may be continuously formed is executed.

SUMMARY

According to an embodiment of the present disclosure, an image forming apparatus includes an image forming device, a driving device, an external temperature detector, an internal temperature detector, a work amount detector, and control circuitry. The image forming device forms an image. The driving device drives the image forming device. The external temperature detector detects an external temperature of the image forming apparatus. The internal temperature detector detects an internal temperature of the image forming apparatus. The work amount detector detects a work amount of the image forming device. The control circuitry controls an operation of the driving device. In a case where the temperature detected by the external temperature detector is lower than an environmental temperature threshold, the control circuitry shifts to a first printing operation restriction state based on the work amount detected by the work amount detector. In the first printing operation restriction state, the control circuitry temporarily stops drive of the image forming device by the driving device for a predetermined period every time the work amount reaches a work amount threshold. In a case where the temperature detected by the external temperature detector is equal to or higher than the environmental temperature threshold, the control circuitry shifts to a second printing operation restriction state based on the internal temperature detected by the internal temperature detector. In the second printing operation restriction state, in a case where the internal temperature is higher than a first threshold, the control circuitry performs an intermittent operation of repeating a pause state in which the drive of the image forming device by the driving device is stopped and a printing state in which the image forming device is driven, until the internal temperature falls to be equal to or lower than a second threshold being lower than the first threshold.

BRIEF DESCRIPTION OF SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted.

DESCRIPTIONS OF EMBODIMENTS

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments are described with reference to the accompanying drawings. In order to facilitate understanding of the description, the same components in the drawings are denoted by the same reference numerals as much as possible, and redundant description is omitted.

Hereinafter, an embodiment is described taking an electrophotographic image forming apparatus including a secondary transfer mechanism called a tandem system is described as an example.

The image forming apparatus is a multifunction peripheral/printer/product (MFP) equipped with a copy function, a print function, and a facsimile function in one housing. Examples of a recording medium include an overhead projector sheet (OHP sheet), thick paper such as a card and a postcard, or an envelope in addition to plain paper generally used for copying; herein, a sheet of paper P (hereinafter a sheet P) is described as an example of the recording medium.

Configuration Example of Image Forming Apparatus

Figure 1:
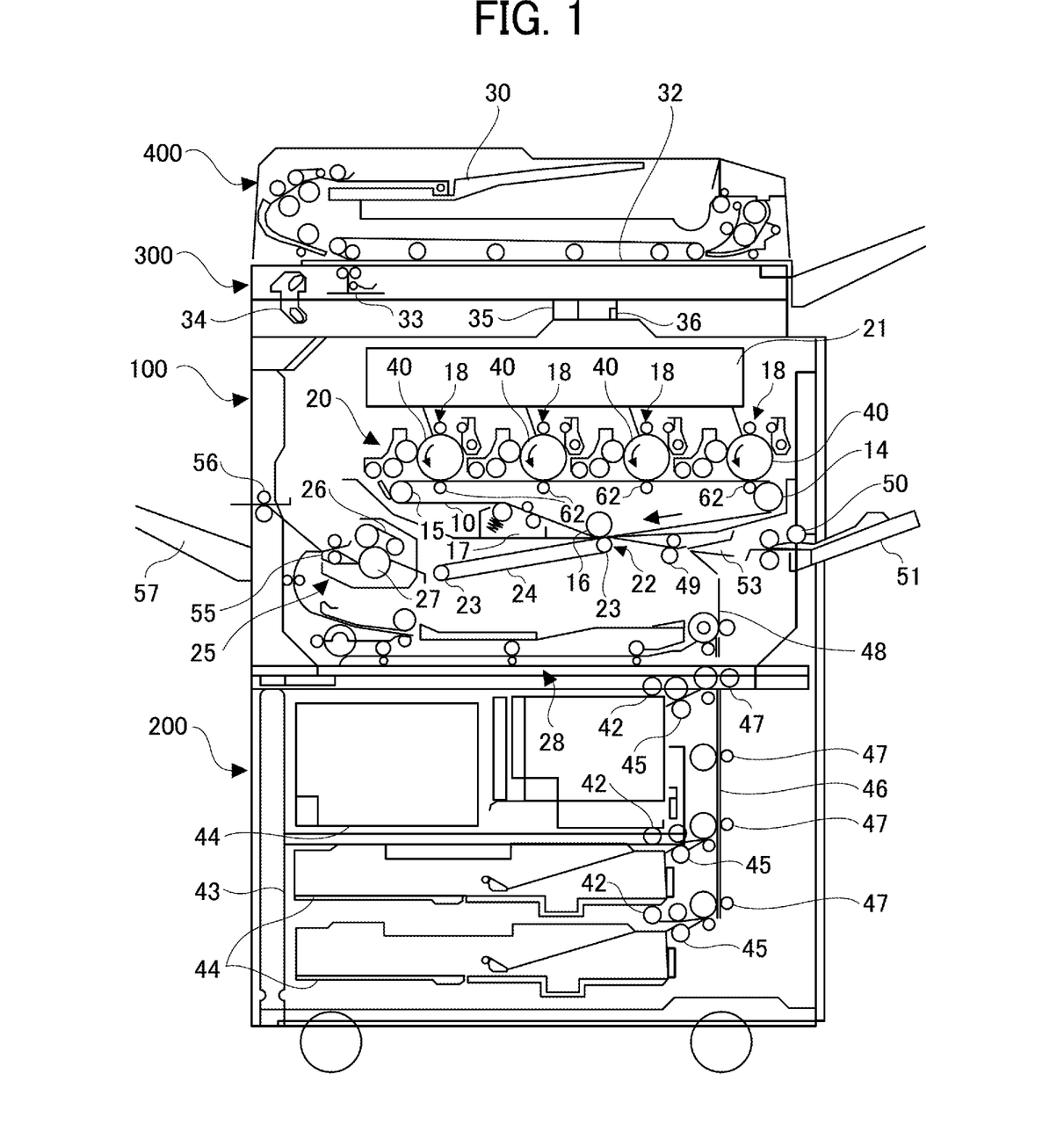
FIG. 1 is a diagram illustrating an example of a configuration of an image foisting apparatus according to an embodiment.

FIG. 1 is a diagram illustrating an example of a configuration of an image forming apparatus 100 according to an embodiment of the present disclosure, a cross-sectional view illustrating a substantial part of the image forming apparatus 100 according to the present embodiment. As illustrated in FIG. 1, the image forming apparatus 100 includes an intermediate transfer unit at the center, and the intermediate transfer unit includes an intermediate transfer belt 10, which is an endless belt. The intermediate transfer belt 10 is stretched around three support rollers 14 to 16 and driven to rotate clockwise.

The image forming apparatus 100 includes an intermediate transferor cleaning unit 17 that removes residual toner remaining on the intermediate transfer belt 10 after image transfer on the left side of a second support roller 15 among the three support rollers 14 to 16.

An image forming device 20 including a yellow (Y) image forming device, a magenta (M) image forming device, a cyan (C) image forming device, and a black (K) image forming device is disposed so as to face the intermediate transfer belt 10 arranged between the first support roller 14 and the second support roller 15, and the image forming devices 20 of the respective colors are arranged in a moving direction of the intermediate transfer belt 10.

The image forming devices 20 of the respective colors have similar configurations except that colors of toner to be used are different. Therefore, in the description and the drawings, subscripts "Y", "M", "C", and "K" indicating the colors of toner to be used may be omitted below.

Each of the image forming devices 20 includes a photoconductor drum 40, a charging roller 18, a developing unit, and a cleaning unit of each color, and is detachably attached to the image forming apparatus 100.

In order to protect the inside of the image forming apparatus 100, the image forming apparatus 100 includes a cover that may be inclined forward (toward a front side of a sheet surface) to be opened and closed. A user of the image forming apparatus 100 or a service person who performs maintenance on the image forming apparatus 10 may open the cover to access the inside of the image forming apparatus 100, and attach and detach the image forming device 20 to and from a predetermined site in the image forming apparatus 100.

The image forming device 20 is, for example, a process cartridge drum unit (hereinafter, referred to as PCDU) replaceable according to a life of the photoconductor drum 40.

The image forming apparatus 100 includes a light beam scanning device 21 above the image forming device 20. The light beam scanning device 21 may irradiate the photoconductor drum 40 of each color with a light beam (laser beam) for image formation to form an electrostatic latent image according to image data on the photoconductor drum 40 of each color.

The electrostatic latent image of the photoconductor drum 40 of each color is developed by the developing unit, and developed toner images of the respective colors are superimposed on the intermediate transfer belt 10 to be primarily transferred. Thus, a color toner image is formed on the intermediate transfer belt 10. The toner image is born on the intermediate transfer belt 10 as an example of an image bearer, and is moved in the moving direction of the intermediate transfer belt 10. A configuration of the image forming device is separately described in detail with reference to FIG. 2.

The image forming apparatus 100 includes a secondary transfer unit 22 below the intermediate transfer belt 10. The secondary transfer unit 22 is arranged so as to bridge a secondary transfer belt 24, which is an endless belt, between two rollers 23, and push up the intermediate transfer belt 10 to press the same against a third support roller 16. The secondary transfer belt 24 may secondarily transfer the toner image on the intermediate transfer belt 10 to the sheet P.

The image forming apparatus 100 further includes a fixing unit 25 on a side of the secondary transfer unit 22. The fixing unit 25 fixes the toner image on the sheet P conveyed in a state in which the toner image is secondarily transferred to the sheet P. The fixing unit includes a fixing belt 26, which is an endless belt, a heating roller, and a pressure roller 27, and may fix the toner image transferred to a surface of the sheet P to the sheet P by heat and pressure by the fixing belt 26 and the pressure roller 27.

The image forming apparatus 100 includes a sheet reversing unit 28 that reverses front and back of the sheet P to send in order to form an image also on a back surface of the sheet P immediately after the image is formed on a front surface of the sheet P, below the secondary transfer unit 22 and the fixing unit 25.

Next, a series of flow in which the image is formed on the sheet P in the image forming apparatus 100 is described.

When a "copy" start button in an operation device is pressed, in a case where a document is placed on a document feeding table 30 of an auto document feeder (ADF) 400, which is a document automatic conveyer, the image forming apparatus 100 allows the ADF 400 to convey the document toward a contact glass 32. In a case where the document is not placed on the document feeding table 30, an image reading unit 300 including a first carriage 33 and a second carriage 34 is driven in order to read the document manually placed on the contact glass 32.

In the image reading unit 300, a light source included in the first carriage 33 irradiates the contact glass 32 with light. Reflected light from the document surface is reflected toward the second carriage 34 by a first mirror included in the first carriage 33, and is reflected by a mirror included in the second carriage 34. The reflected light from the document surface is imaged on an imaging surface of a charge coupled device (CCD) 36 as a reading sensor by an imaging forming lens 35. The CCD 36 captures an image of the document surface, and image data of each color of Y, M, C, and BK is generated on the basis of an image signal captured by the CCD 36.

When a "print" start button is pressed, when there is an instruction to form an image from an external apparatus such as a personal computer (PC), or when there is an output instruction of facsimile (FAX), the image forming apparatus 100 starts rotary drive of the intermediate transfer belt 10 and performs image formation preparation of each unit of the image forming device 20.

Thereafter, the image forming apparatus 100 starts an image forming process of each color. The photoconductor drum 40 for each color is irradiated with a laser modulated on the basis of image data of each color to form an electrostatic latent image. The toner images of the respective colors obtained by developing the electrostatic latent image are superimposed to be formed as one image on the intermediate transfer belt 10.

Thereafter, the sheet P is sent to the secondary transfer unit 22 at a certain timing so that a leading end of the sheet P enters the secondary transfer unit 22 at a timing at which a leading end of the toner image on the intermediate transfer belt 10 enters the secondary transfer unit 22. The toner image on the intermediate transfer belt 10 is secondarily transferred to the sheet P by the secondary transfer unit 22. The sheet P to which the toner image is secondarily transferred is sent to the fixing unit 25, and the toner image is fixed to the sheet P.

Feeding of the sheet P to a secondary transfer position is herein described. When one of sheet feeding rollers 42 of the sheet feeding table 200 is rotary driven, the sheet P is fed from one of sheet feeding trays 44 provided in multiple stages in a sheet feeding unit 43. Thereafter, only one sheet is separated by a separation roller 45, and this enters a conveying roller unit 46 to be conveyed by a conveying roller 47. Thereafter, the sheet is guided to a conveying roller unit 48 in the image forming apparatus 100, abuts a registration roller pair 49 of the conveying roller unit 48 and is temporarily stopped, then sent toward the secondary transfer unit 22 in accordance with a timing of the secondary transfer as described above.

The user may insert the sheet P into a manual sheet feeding tray 51 to feed the paper. In a case where the user inserts the sheet P into the manual sheet feeding tray 51, the image forming apparatus 100 rotary drives a sheet feeding roller 50 to separate one sheet of the sheet P on the manual sheet feeding tray 51 and retract the same into a bypass sheet feeding path 53. As in the above-described manner, the sheet is allowed to abut the registration roller pair 49 to be temporarily stopped, and then sent to the secondary transfer unit 22 at the timing of the secondary transfer described above.

The sheet P fixed by the fixing unit 25 to be discharged is guided to a discharge roller 56 by a switching claw 55, discharged by the discharge roller 56, and stacked on a discharge tray 57. Alternatively, this is guided to the sheet reversing unit 28 by the switching claw 55, reversed by the sheet reversing unit 28, and is guided again to the secondary transfer position. Thereafter, an image is also formed on the back surface of the sheet P, and then the sheet P is discharged onto the sheet discharge tray 57 by the discharge roller 56.

The residual toner remaining on the intermediate transfer belt 10 after the image transfer is removed by the intermediate transferor cleaning unit 17, and is reserved for next image formation.

In this manner, the image forming apparatus 100 may form the color image on the sheet P.

Configuration Example of Image Forming Device

Next, a configuration of the image forming device 20 in the image forming apparatus 100 is described with reference to FIG. 2.

Figure 2:
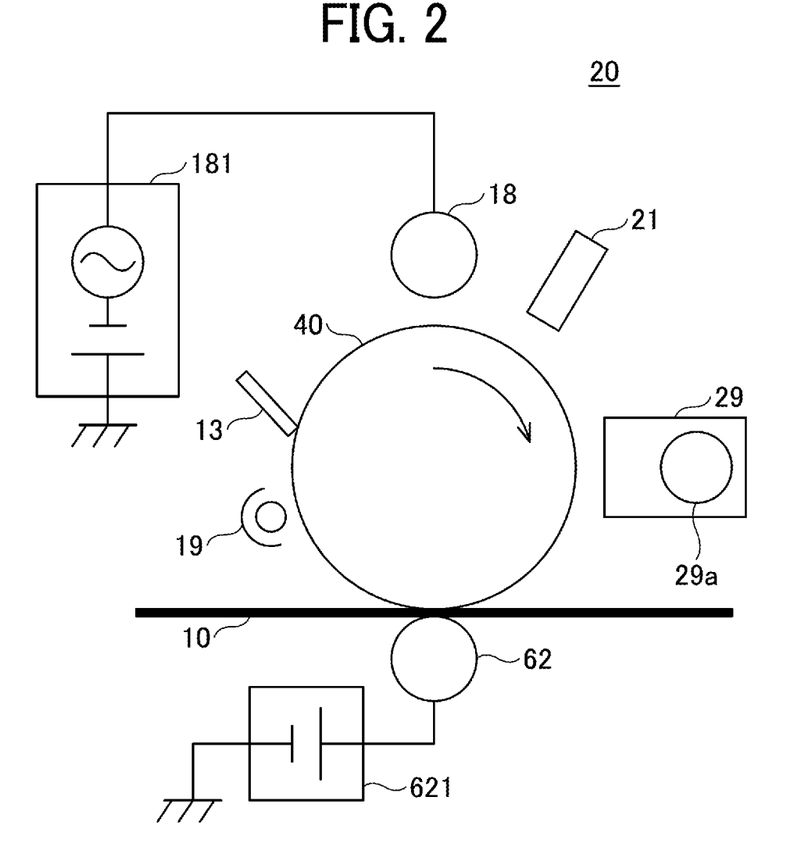
FIG. 2 is a diagram illustrating an example of a configuration of an image forming device.

FIG. 2 is a diagram illustrating an example of the configuration of the image forming device 20, and illustrates a configuration example of one of the image forming devices of the respective colors. As described above, since the image forming devices of the other three colors have the similar configuration except that the colors of the toner to be used are different, only one image forming device is described without repeating illustration and description of the other image forming devices.

The image forming device 20 includes the photoconductor drum 40, the charging roller 18, a developing device 29, a cleaning blade 13, a neutralizer 19, and a primary transfer roller 62. A charging high-voltage power supply 181 is electrically connected to the charging roller 18, and a transferring high-voltage power supply 621 is electrically connected to the primary transfer roller 62.

The photoconductor drum 40 as an example of the image bearer is a negatively charged organic photoconductor obtained by providing a photosensitive layer and the like on a drum-shaped conductive support. In the photoconductor drum 40, an undercoat layer as an insulating layer, a charge generation layer and a charge transport layer as the photosensitive layer, and a protective layer, that is, a surface layer are sequentially stacked on the conductive support as a base layer. For the conductive support of the photoconductor drum 40, a conductive material having a volume resistivity of $10^{10}$ Ωcm or less may be used.

The charging roller 18 is a roller member obtained by covering an outer periphery of a conductive cored bar with an elastic layer having medium resistance. A predetermined voltage is applied from the charging high-voltage power supply 181 to uniformly charge the surface of the photoconductor drum 40 facing the charging roller 18. A cleaning roller that removes dirt from the charging roller 18 may be provided in contact with the charging roller 18.

A minute gap is provided between the charging roller 18 and the photoconductor drum 40, and the charging roller 18 is arranged in a non-contact state with respect to the photoconductor drum 40. A charging system for charging the photoconductor drum 40 in such a state is referred to as a non-contact charging system.

In the non-contact charging system, as compared with a contact charging system in which the charging roller 18 and the photoconductor drum 40 are brought into contact with each other and charged, foreign matters such as toner and lubricant remaining on the photoconductor drum 40 are less likely to adhere to the charging roller 18, so that charging unevenness due to adhesion of the foreign matters may be suppressed. However, the embodiment is not limited to the non-contact charging system, and may be applied to the contact charging system. The charging high-voltage power supply 181 applies a charging bias to the charging roller 18.

The developing device 29 includes a developing roller 29a facing the photoconductor drum 40. The developing roller 29a includes a magnet fixed inside to form a magnetic pole on a roller peripheral surface, and a sleeve that rotates around the magnet. A plurality of magnetic poles is formed on the developing roller 29a by the magnet, and a developer is carried on the developing roller 29a.

The cleaning blade 13 mechanically scrapes off adhesion such as untransferred toner adhering to the surface of the photoconductor drum 40. The cleaning blade 13 is a blade-shaped member formed of a rubber material such as urethane rubber into a substantially plate shape, and abuts the surface of the photoconductor drum 40 at a predetermined angle and at a predetermined pressure.

The neutralizer 19 removes charges on the surface of the photoconductor drum 40 after the toner image is transferred.

The photoconductor drum 40 uniformly charged by the charging roller 18 is exposed by the light beam by the light beam scanning device 21 according to the image data. The electrostatic latent image is formed on the surface of the photoconductor drum 40. The developing device 29 adheres the toner to the electrostatic latent image on the surface of the photoconductor drum 40. As a result, the toner image is developed on the surface of the photoconductor drum 40.

When the voltage generated by the transferring high-voltage power supply 621 is applied to the primary transfer roller 62, the toner image on the surface of the photoconductor drum 40 is transferred to the intermediate transfer belt 10. The toner image on the intermediate transfer belt 10 is transferred to the sheet P by the secondary transfer unit 22, and is fixed to the sheet P by the fixing unit 25. Residual toner on the surface of the photoconductor drum is removed by the cleaning blade 13. The charges on the surface of the photoconductor drum 40 are removed by the neutralizer 19.

Hardware Configuration Example of Image Forming Apparatus

Figure 3:
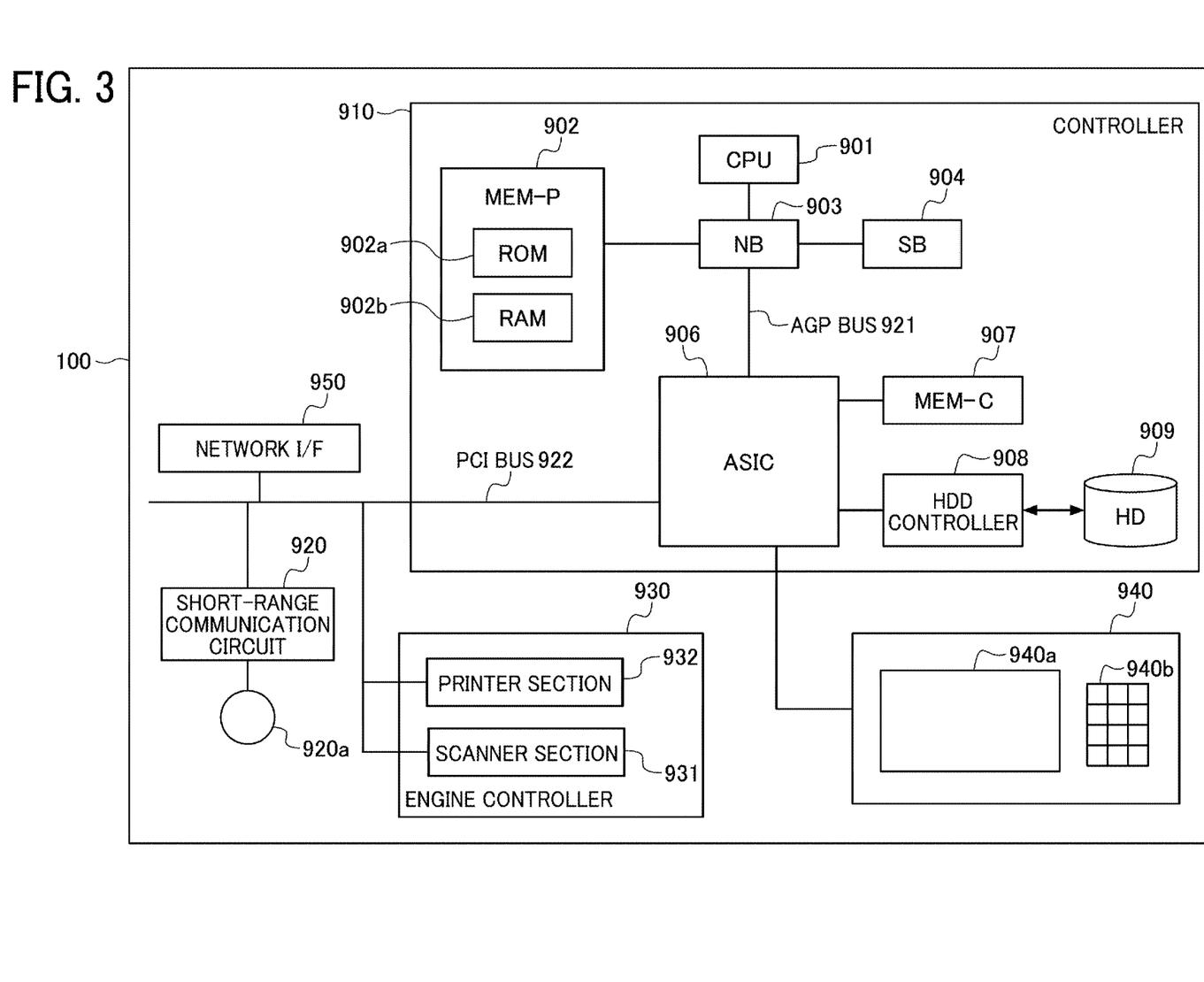
FIG. 3 is a block diagram illustrating an example of a hardware configuration of the image forming apparatus.

Next, a hardware configuration of the image forming apparatus 100 is described. FIG. 3 is a block diagram illustrating an example of the hardware configuration of the image forming apparatus 100.

As illustrated in FIG. 3, the image forming apparatus 100 includes a controller 910, a short-range communication circuit 920, an engine controller 930, an operation panel 940, a network interface (I/F) 950, and a control board 960.

Among these components, the controller 910 includes a CPU 901, which is a substantial part of a computer, a system memory (MEM-P) 902, a north bridge (NB) 903, a south bridge (SB) 904, an application specific integrated circuit (ASIC) 906, a local memory (MEM-C) 907, which is a memory, a hard disk drive (HDD) controller 908, and a hard disk (HD) 909, which is a memory. The NB 903 and the ASIC 906 are connected by an accelerated graphics port (AGP) bus 921.

Among these components, the central processing unit (CPU) 901 is circuitry that controls an entire image forming apparatus 100. The NB 903 is a bridge for connecting the CPU 901, the MEM-P 902, the SB 904, and the AGP bus 921, and includes a memory controller that controls reading/writing from/to the MEM-P 902, a peripheral component interconnect (PCI) master, and an AGP target.

The MEM-P 902 includes a read only memory (ROM) 902a, which is a memory for storing programs and data for implementing each function of the controller 910, and a random access memory (RAM) 902b used as a drawing memory when expanding programs and data and at the time of memory printing.

The program stored in the RAM 902b may be recorded in a computer-readable recording medium such as a compact disc-read only memory (CD-ROM), a compact disc-recordable (CD-R), or a digital versatile disc (DVD) as a file in an installable format or an executable format to be provided.

The SB 904 is a bridge for connecting the NB 903 to a PCI device and a peripheral device. The ASIC 906 is an integrated circuit (IC) for image processing application including a hardware element for image processing, and serves as a bridge that connects the AGP bus 921, a PCI bus 922, the HDD 908, and the MEM-C 907 to each other.

The ASIC 906 includes a PCI target, an AGP master, an arbiter (ARB) that forms a core of the ASIC 906, a memory controller that controls the MEM-C 907, a plurality of direct memory access controllers (DMACs) that rotates image data by hardware logic, and a PCI unit that performs data transfer between a scanner section 931 and a printer section 932 via the PCI bus 922.

To the ASIC 906, a universal serial bus (USB) interface or an Institute of Electrical and Electronics Engineers 1394 (IEEE 1394) interface may be connected.

The MEM-C 907 is a local memory used as a copy image buffer and a code buffer. The HD 909 is a storage for accumulating image data, accumulating font data used at the time of printing, and accumulating forms. The HD 909 controls reading/writing of data from/to the HD 909 under the control of the CPU 901.

The AGP bus 921 is a bus interface for a graphics accelerator card proposed for speeding up graphics processing, and may directly access the MEM-P 902 with high throughput to speed up the graphics accelerator card.

The short-range communication circuit 920 includes a short-range communication circuit 920a. The short-range communication circuit 920 is a communication circuit of near field communication (NFC) and Bluetooth (registered trademark).

The engine controller 930 includes the scanner section 931 and the printer section 932. The image forming device 20 illustrated in FIG. 2 is included in the printer section 932.

The operation panel 940 includes a panel display 940a such as a touch panel that displays a current set value and a selected screen and accepts an input from an operator, and an operation panel 940b including a numeric keypad that accepts a set value of a condition regarding image formation such as a density setting condition, and a start key that accepts a copy start instruction.

The controller 910 controls the entire image forming apparatus 100 and controls, for example, drawing, communication, and input from the operation panel 940. The scanner section 931 or the printer section 932 includes an image processing part such as error diffusion or gamma conversion.

The image forming apparatus 100 may sequentially switch to select a document box function, a copy function, a printer function, and a facsimile function by an application switching key of the operation panel 940.

When the document box function is selected, a document box mode is set, when the copy function is selected, a copy mode is set, when the printer function is selected, a printer mode is set, and when the facsimile mode is selected, a facsimile mode is set.

The network I/F 950 is an interface for performing data communication using a network. The short-range communication circuit 920 and the network I/F 950 are electrically connected to the ASIC 906 via the PCI bus 922.

Control System of Image Forming Device

Figure 4:
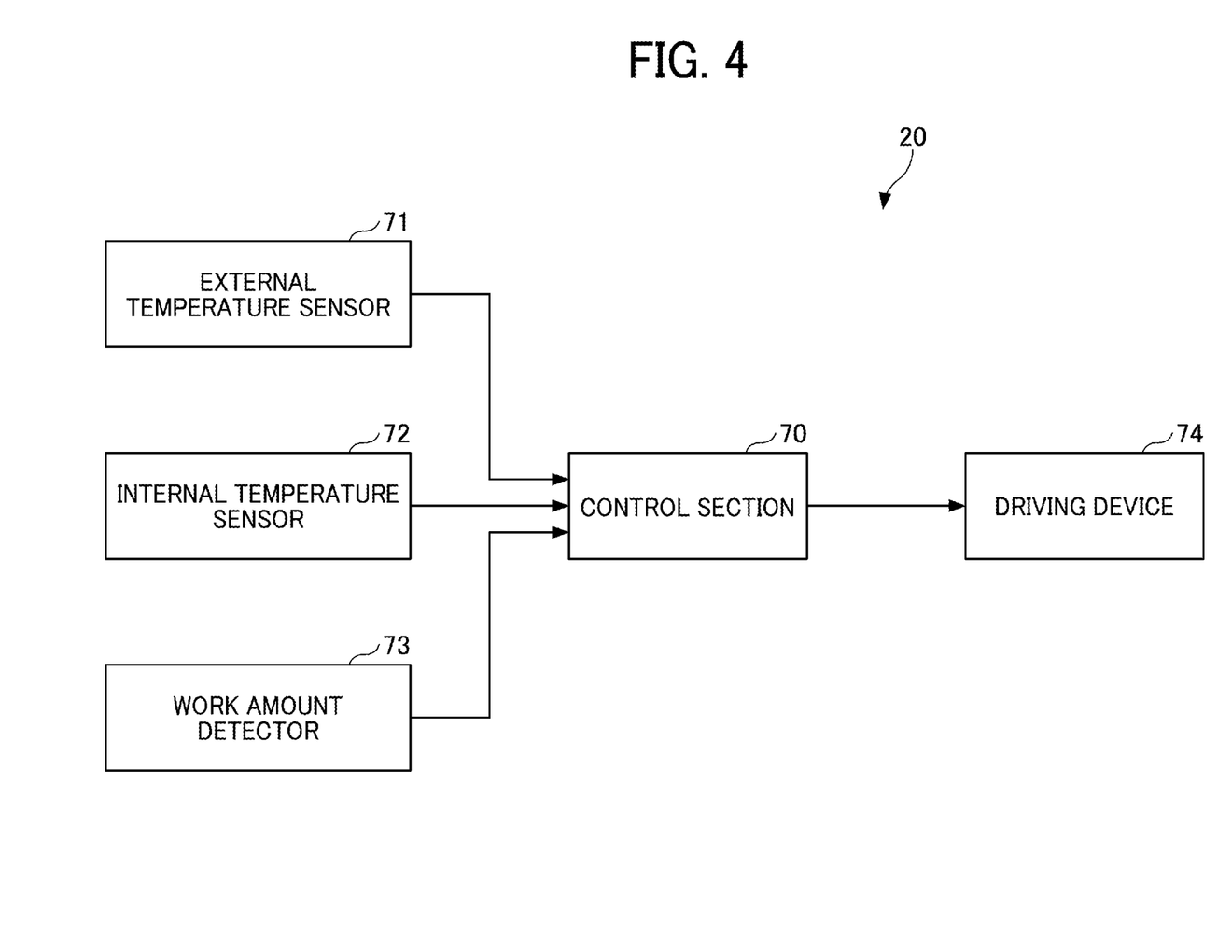
FIG. 4 is a block diagram illustrating a configuration of a substantial part of a control system of the image forming device.

FIG. 4 is a block diagram illustrating a configuration of a substantial part of a control system of the image forming device 20. As illustrated in FIG. 4, the image forming apparatus 100 includes control section 70, an external temperature sensor 71 (external temperature detector), an internal temperature sensor 72 (internal temperature detector), a work amount detector 73, and a driving device 74 as a control system of the image forming device 20.

As described above, the image forming device 20 is an element that forms an image in the image forming apparatus 100. The driving device 74 is an element that drives the image forming device 20. The driving device 74 applies a driving force to the photoconductor drum 40, the developing roller 29a, the charging roller 18, and the primary transfer roller 62 among the components of the image forming device 20 illustrated in FIG. 2, for example. The driving device 74 includes, for example, a motor as a drive source, and transmits power to each component of the image forming device 20 via a power transmission mechanism such as a gear system.

The control section 70 controls an operation of the driving device. For example, as illustrated in FIG. 4, the control section 70 outputs a control command to the driving device 74 on the basis of various types of information regarding the image forming apparatus 100 and the image forming device 20 acquired from the external temperature sensor 71, the internal temperature sensor 72, and the work amount detector 73, thereby controlling an operation of the image forming device 20.

The external temperature sensor 71 detects temperature outside the image forming apparatus 100. The external temperature sensor 71 is installed in, for example, an external housing of the image forming apparatus 100.

The internal temperature sensor 72 detects temperature in the image forming apparatus 100. The internal temperature sensor 72 is installed in, for example, a gap between various elements of the image forming device 20 illustrated in FIG. 2.

The work amount detector 73 detects a work amount of the image forming device 20. In this embodiment, the "work amount" includes information regarding the number of pages to be continuously printed by the image forming device 20. The work amount detector 73 is installed at any position in the image forming apparatus 100 capable of detecting the work amount of the image forming device 20.

In particular, in this embodiment, the control section 70 may control the image forming device 20 (printing operation restriction mode control) to switch between two printing operation restriction states on the basis of the temperature outside the image faulting apparatus 100.

More specifically, in a case where the temperature detected by the external temperature sensor 71 is lower than a predetermined "environmental temperature threshold TA", the control section 70 shifts to a "first printing operation restriction state" on the basis of the work amount detected by the work amount detector 73 (that is, the number of pages to be continuously printed by the image forming device 20). In the first printing operation restriction state, the drive of the image forming device 20 by the driving device 74 is temporarily stopped for a predetermined period every time the work amount reaches a predetermined work amount threshold (that is, every time this reaches a predetermined number of pages to be continuously printed).

In a case where the temperature detected by the external temperature sensor 71 is equal to or higher than environmental temperature threshold TA, the control section 70 shifts to a "second printing operation restriction state" on the basis of the internal temperature detected by the internal temperature sensor 72. In the second printing operation restriction state, in a case where the internal temperature is higher than a predetermined internal temperature threshold, an intermittent operation is performed in which a pause state in which the drive of the image forming device 20 by the driving device 74 is stopped and a printing state in which the image forming device 20 is driven are repeated until the internal temperature falls below the internal temperature threshold.

The control section 70 may be formed as a part of the controller 910 that controls the entire operation of the image forming apparatus 100, for example. Alternatively, the control section 70 may be formed as a control board including a CPU and a RAM provided in the image forming apparatus 100 separately from the controller 910. Each function of the control section 70 described above is implemented by operating various types of hardware such as a communication module, an input device, and an output device under the control of the CPU by loading predetermined computer software on hardware such as the CPU and the RAM, and reading/writing data from/in the RAM and an auxiliary storage device.

Each function of the control section 70 implemented when the CPU executes a predetermined program may be implemented by an electronic circuit such as an application specific integrated circuit (ASIC) or a field programmable gate array (FPGA).

As the "work amount of the image forming device 20" detected by the work amount detector 73 and used by the control section 70 to determine whether to shift to the "first printing operation restriction state", information other than the number of pages to be continuously printed described above may be used. For example, information such as a continuous operation time of the driving device 74 of the image forming device 20 and a travel distance of the image forming device 20 may be used.

Description of Printing Operation Restriction Mode Control

A difference between a printing operation restriction mode of a comparative example and the printing operation restriction mode of this embodiment is described with reference to FIGS. 5 to 7.

Printing Operation Restriction Mode in Comparative Example

Figure 5:
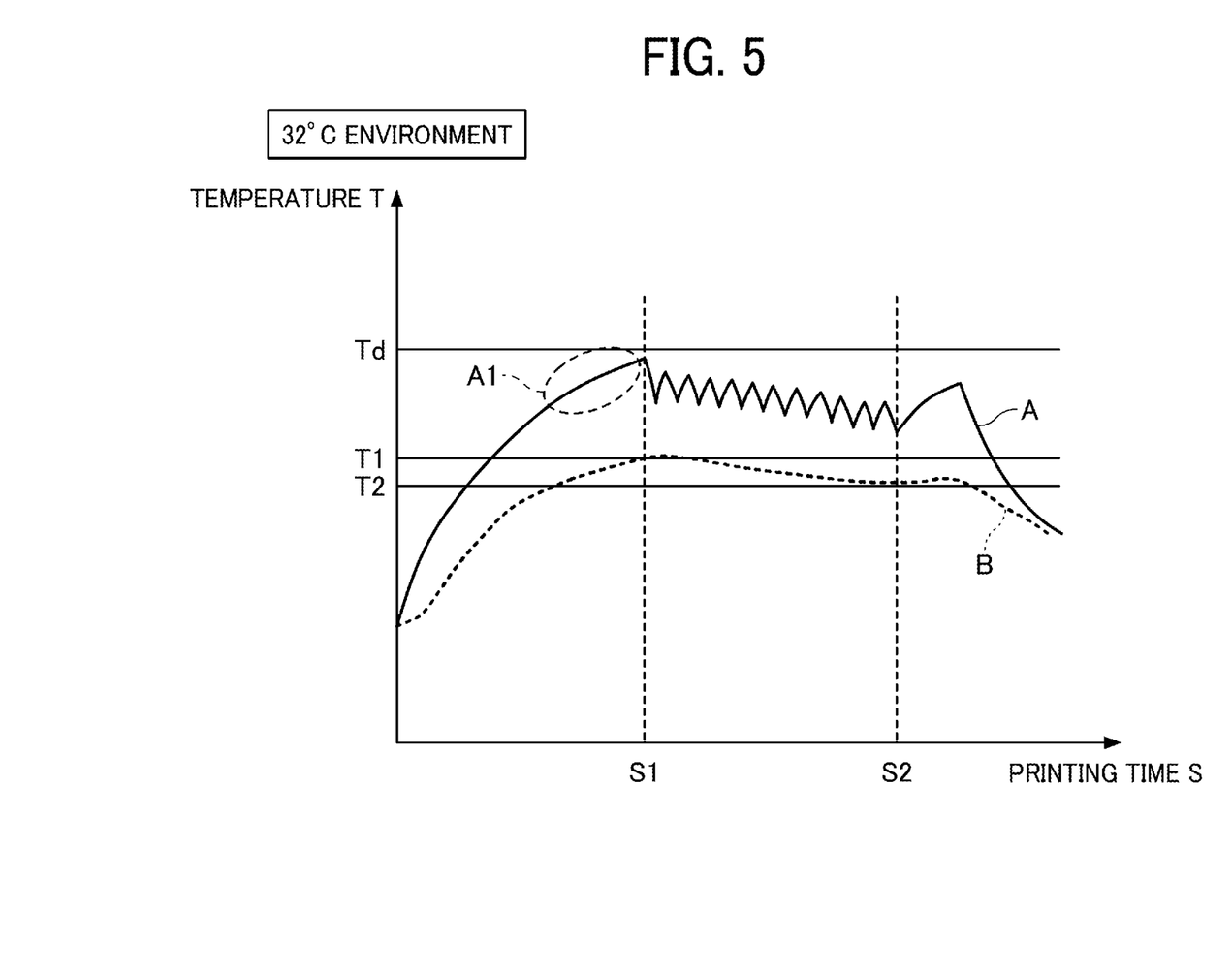
FIG. 5 is a sequence diagram of an example of a printing operation restriction mode of a comparative example.

FIG. 5 is a sequence diagram of the printing operation restriction mode of the comparative example. In FIG. 5, temperature T (° C.) of the image forming device 20 is plotted along the ordinate, and printing time S (second) of the image forming device 20 is plotted along the abscissa. Solid graph A in FIG. 5 indicates actual temperature in the image forming device 20. Dotted graph B indicates the temperature measured by the internal temperature sensor 72. FIG. 5 illustrates transition of the internal temperature in a case where the temperature (environmental temperature) outside the image forming apparatus 100 is 32° C.

When the temperature of the image forming device 20 (bearing for development and the like) rises, a defect such as toner adhesion might occur. In order not to cause such defect, in a method of the comparative example, the internal temperature sensor 72 is disposed that detects the temperature of the image forming device 20, and when a value of the internal temperature sensor 72 is equal to or higher than a threshold, the control section 70 enters the printing operation restriction mode of restricting a printing operation.

As illustrated in FIG. 5, in order to prevent the temperature of the image forming device 20 from exceeding predetermined upper limit temperature Td (for example, 45° C.), the control section 70 enters the printing operation restriction mode when the detected temperature detected by the internal temperature sensor 72 exceeds a predetermined first threshold T1 (for example, 40° C. lower than Td) at a printing time S1.

In the printing operation restriction mode, the intermittent operation of repeating the pause state in which the drive of the image forming device 20 is stopped and the printing state (for example, stopping for 25 seconds and printing by 20 pages) is executed to decrease productivity to prevent a rise in temperature of the image forming device 20. Such printing operation restriction mode of the comparative example is referred to as the "second printing operation restriction state" as described above in this embodiment.

In the example in FIG. 5, by continuing the printing operation restriction mode in a section of the printing time S1 to a printing time S2, the temperature of the image forming device 20 falls, and when the value of the internal temperature sensor 72 reaches a predetermined second threshold T2 (for example, 39° C. lower than the first threshold T1) at the printing time S2, the printing operation restriction mode is canceled and normal continuous printing is resumed.

There is deviation between the temperature of the image forming device 20 to be actually controlled (graph A) and the value of the internal temperature sensor 72 (graph B), and a deviation amount varies depending on the environmental temperature, which is a disadvantage in performing optimum control in the method of the comparative example. As illustrated in FIG. 5, in a high temperature environment in which the environmental temperature exceeds 30° C., as illustrated in behavior A1 immediately before the printing time S1 in graph A, the control section 70 shifts to the printing operation restriction mode in a state in which a temperature rising gradient of the image forming device 20 is large. In the printing operation restriction mode, the drive of the image forming device 20 stops during the pause, so that the temperature of the image forming device 20 falls; however, when the printing is resumed after a certain period of time, the temperature of the image forming device rises again because the temperature rising gradient of the image forming device 20 is large. Continuing this operation, the temperature of the image forming device 20 and the detected temperature by the internal temperature sensor 72 gradually fall, and when the control section 70 determines that the detected temperature falls to T2 and the image formation temperature falls to a temperature with a margin with respect to Td, the printing operation restriction mode is canceled.

Method of Comparative Example

Figure 6:
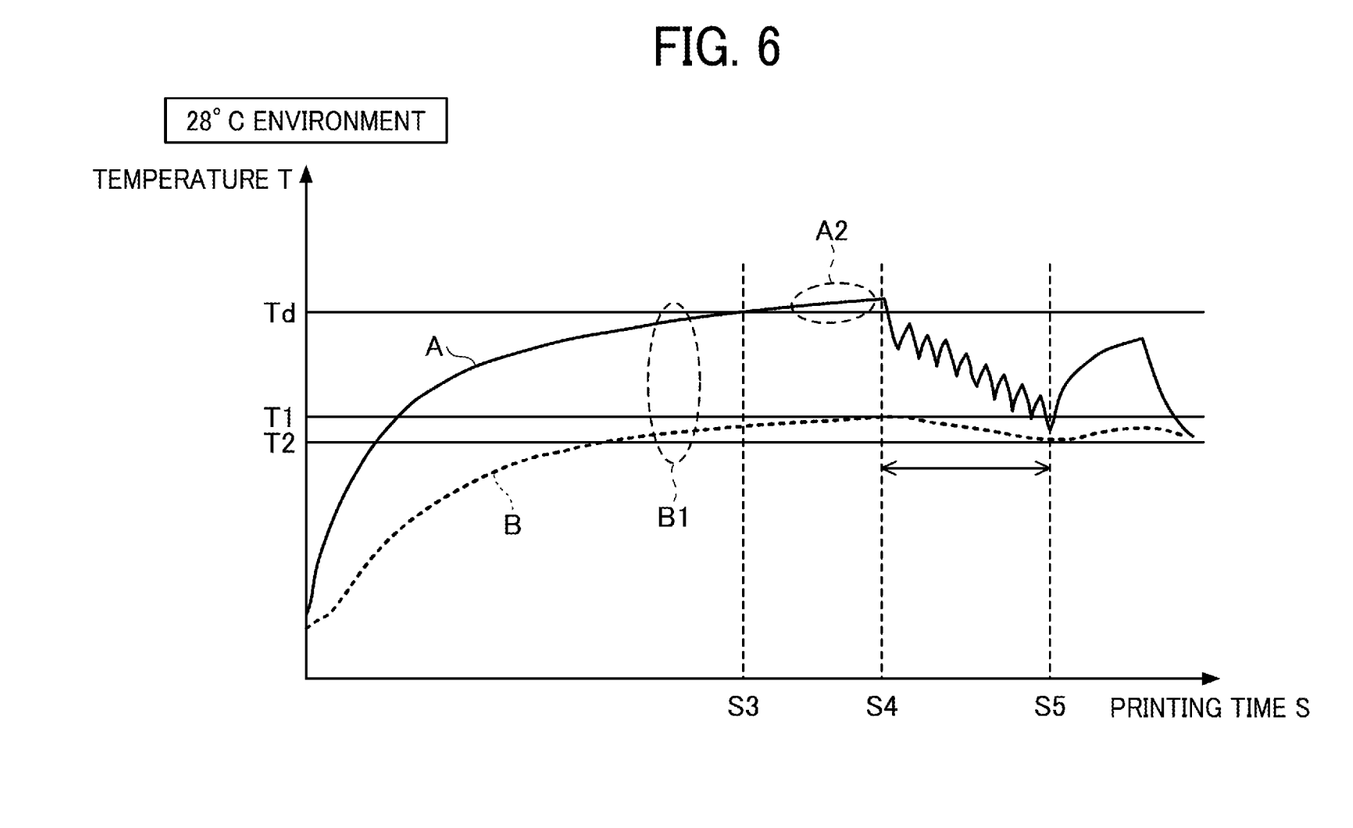
FIG. 6 is a sequence diagram of another example of the printing operation restriction mode of the comparative example.

FIG. 6 is a sequence diagram of another example of the printing operation restriction mode of the comparative example. FIG. 6 illustrates transition of actual temperature of the image forming device 20 (graph A) and the detected temperature by the internal temperature sensor 72 (graph B) at the time of continuous printing in a low temperature environment (for example, 28° C.) in which the environmental temperature is lower than that in FIG. 5. The ordinate and abscissa in FIG. 6 are similar to those in FIG. 5.

The temperature of the image forming device 20 rises by heat generated by its own rotation, and actual temperature A of the image forming device does not have a large difference in temperature rising gradient due to a difference in environmental temperature between FIGS. 5 and 6. The internal temperature sensor 72 is not directly attached to a rotating body of the image forming device 20, and detects ambient temperature in the vicinity of the image forming device 20. Therefore, when the environmental temperature falls as in the example in FIG. 6, detected temperature B by the internal temperature sensor 72 is affected by this, and the rise in temperature becomes gentle. As a result, in the low temperature environment illustrated in FIG. 6, for example, as illustrated in area B1 in FIG. 6, a difference between actual temperature A of the image forming device 20 and detected temperature B by the internal temperature sensor 72 is larger than that in the high temperature environment illustrated in FIG. 5.

In a 32° C. environment (high temperature environment) illustrated in FIG. 5, when the temperature of the image forming device 20 rises up to Td at the printing time S1, the internal temperature rises up to the first threshold T1 and the control section 70 enters the printing operation restriction mode. However, as illustrated in FIG. 6, in a 28° C. environment (low temperature environment), when the temperature of the image forming device 20 reaches Td (a printing time S3), the internal temperature does not rise up to the first threshold T1, and the control section 70 does not shift to the printing operation restriction mode. This is a first disadvantage of the method of the comparative example.

Due to the first disadvantage, when the internal temperature rises up to the first threshold T1 at a printing time S4, the temperature of the image forming device 20 exceeds Td, and the risk of defect due to toner aggregation increases. In order to deal with this disadvantage, it is preferable to lower temperature threshold setting of the first threshold T1; however, since the first threshold T1 takes a similar value also in the 32° C. environment (high temperature environment in FIG. 5), productivity is deteriorated also in the high temperature environment such as the 32° C. environment. That is, when the first threshold T1 is lowered in the high temperature environment in FIG. 5, the control section 70 enters the printing operation restriction mode at a timing earlier than the printing time S1. In this case, the printing operation restriction mode is performed even in a section in which the actual temperature of the image forming device 20 is sufficiently lower than Td and it is not necessary to perform, a printing amount decreases accordingly, and as a result, the productivity is deteriorated.

In a case of shifting to the printing operation restriction mode in the 28° C. environment (low temperature environment), as illustrated in behavior A2 immediately before the printing time S4 in graph A, the temperature rising gradient of the image forming device is smaller than that in the high temperature environment illustrated in FIG. 5. That is, the control section 70 enters the printing operation restriction mode in a state close to a saturation state. When the drive of the image forming device 20 decreases during the pause of the printing operation restriction mode, the temperature of the image forming device 20 falls. When the printing is resumed after a certain period of time, the temperature of the image forming device 20 rises again, but the temperature of the image forming device 20 is close to saturation temperature, and outside air temperature is low and cooling efficiency of a fan becomes high, so that a temperature rising amount after the resumption decreases. As a result, in the low temperature environment in FIG. 6, a temperature falling amount is larger than that in the high temperature environment in FIG. 5 in a section of the printing time S4 to a printing time S5 in the printing operation restriction mode. Since the image forming device 20 itself is driven to serve as a heat source, when the drive is decreased, the temperature rapidly falls.

Since the internal temperature sensor 72 is not attached to the rotating body, this is arranged in the vicinity of the image forming device 20 and detects the ambient temperature of the image forming device 20. Therefore, in the section of the printing time S4 to the printing time S5 in the printing operation restriction mode, a falling gradient of the detected temperature by the internal temperature sensor 72 is smaller than that of the actual temperature of the image forming device 20. As a result, in the printing operation restriction mode, even when the temperature of the image forming device 20 itself sufficiently falls, and it is in a state in which the printing operation restriction mode may be canceled, the detected temperature by the internal temperature sensor 72 does not fall, and the printing operation restriction mode is continued until the temperature falls to the second threshold T2 at the printing time S5. This is a second disadvantage of the method of the comparative example.

The second disadvantage deteriorates the productivity of the user. That is, in the low temperature environment in FIG. 6, it is originally possible to return from the printing operation restriction mode to normal printing at a timing earlier than the printing time S5, but the printing operation restriction mode is performed even in a section in which it is not necessary to perform, and the printing amount decreases accordingly, and as a result, the productivity is deteriorated. In this manner, the method of the comparative example has a disadvantage that the productivity of printing cannot be optimized.

Printing Operation Restriction Mode Control of Embodiment

Figure 7:
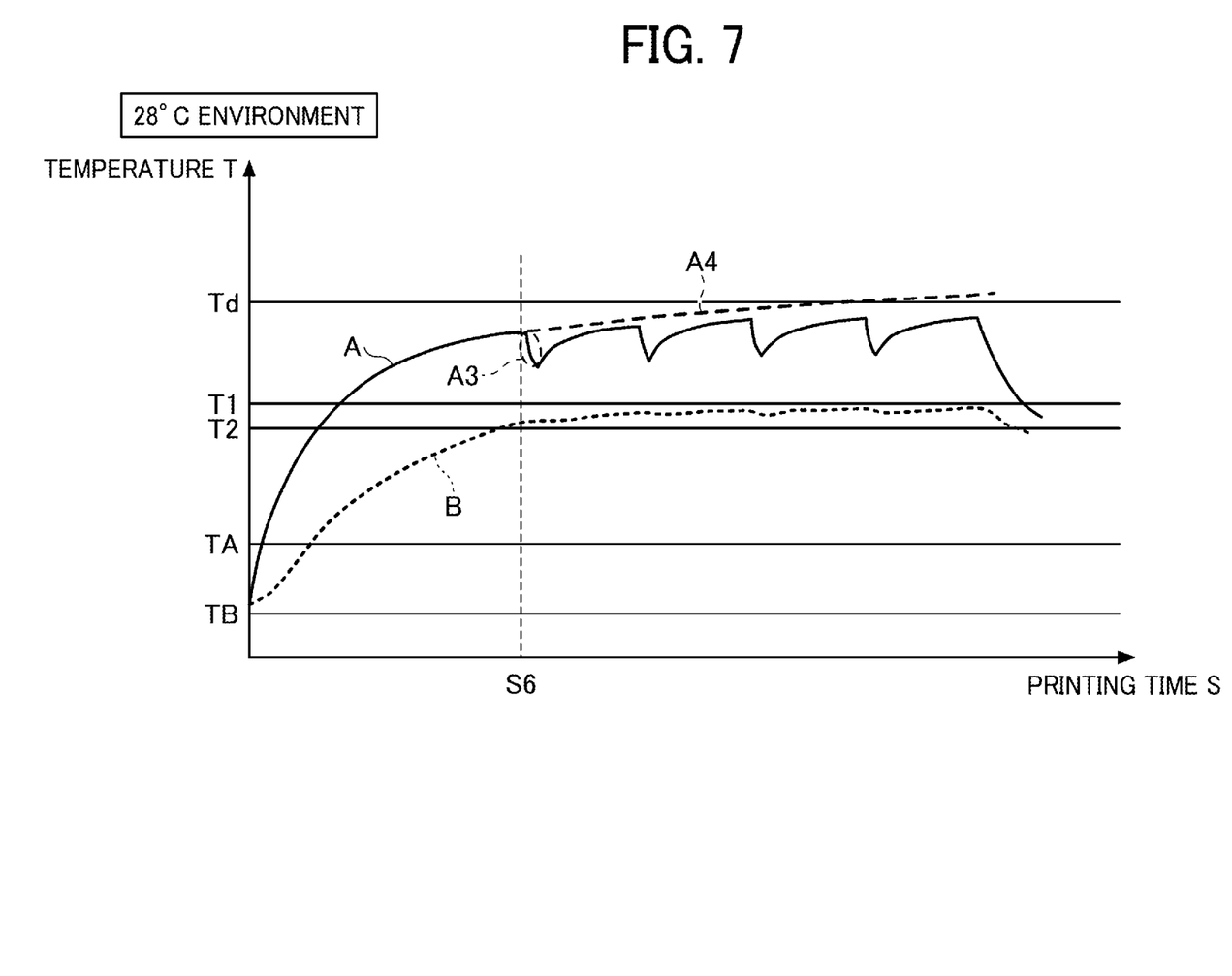
FIG. 7 is a sequence diagram of a printing operation restriction mode of this embodiment.

FIG. 7 is a sequence diagram of the printing operation restriction mode of this embodiment. A specification of graphs illustrated in FIG. 7 is similar to that in FIGS. 5 and 6. FIG. 7 illustrates transition in the low temperature environment similar to that in FIG. 6.

In this embodiment, in a case where the environmental temperature is low, a temporary pause is provided not by the detected temperature by the internal temperature sensor 72 (graph B) but by the number of sheets continuously printed (or information regarding the work amount such as duration). For example, even in a case where the detected temperature by the internal temperature sensor 72 does not rise up to the first threshold T1 as at a printing time S6 in FIG. 7, for example, when continuous printing of 600 pages (corresponding to 10 minutes) is performed, a pause of a predetermined time (for example, 30 seconds) is provided. The printing operation restriction mode newly used in this embodiment is referred to as the "first printing operation restriction state" as described above in this embodiment.

As described above, in a case where the environmental temperature is low, the temperature falling gradient of the image forming device 20 when the drive of the image forming device 20 is stopped is large, so that the actual temperature of the image forming device 20 may be sufficiently lowered by a temporary pause of about 30 seconds as illustrated in behavior A3 immediately after the printing time S6 in graph A without continuously repeating the pause and printing in a short span, and a subsequent printing time may be prolonged. By introducing this operation, it is possible to suppress the rise in temperature of the image forming device 20 as compared with a case where the printing is continuously continued (dotted portion A4 after the printing time S6 in graph A in FIG. 7), and the actual temperature of the image forming device 20 may be maintained at temperature equal to or lower than Td at which the defect such as adhesion highly possibly occurs. As a result, it is not necessary to shift to the printing operation restriction mode of repeating pause and printing in a short span in which the productivity is significantly deteriorated as in the comparative example, and it is possible to minimize deterioration in productivity of the user while preventing the defect such as toner adhesion due to the rise in internal temperature.

In this manner, this embodiment has the two printing operation restriction modes depending on the environmental temperature, and in the first restriction mode, the temporary pause is provided by the information regarding the work amount of the printing operation such as the number of sheets to be continuously printed or the duration. That is, the printing operation restriction mode control of switching between the two printing operation restriction states of the "first printing operation restriction state" and the "second printing operation restriction state" described above is performed on the basis of the change in environmental temperature outside the image forming apparatus 100. In a case where the environmental temperature is relatively high, the second printing operation restriction state is performed on the basis of the detected temperature by the internal temperature sensor 72. In a case where the environmental temperature is relatively low, the first printing operation restriction state is executed on the basis of the work amount detected by the work amount detector 73 (that is, information such as the number of pages to be continuously printed by the image forming device 20). In this embodiment, it is possible to suppress wasteful execution of the printing operation restriction mode due to the change in environmental temperature, and to minimize the deterioration in productivity by such printing operation restriction mode control.

Flowchart of Printing Operation State Restriction Mode Control

Figure 8:
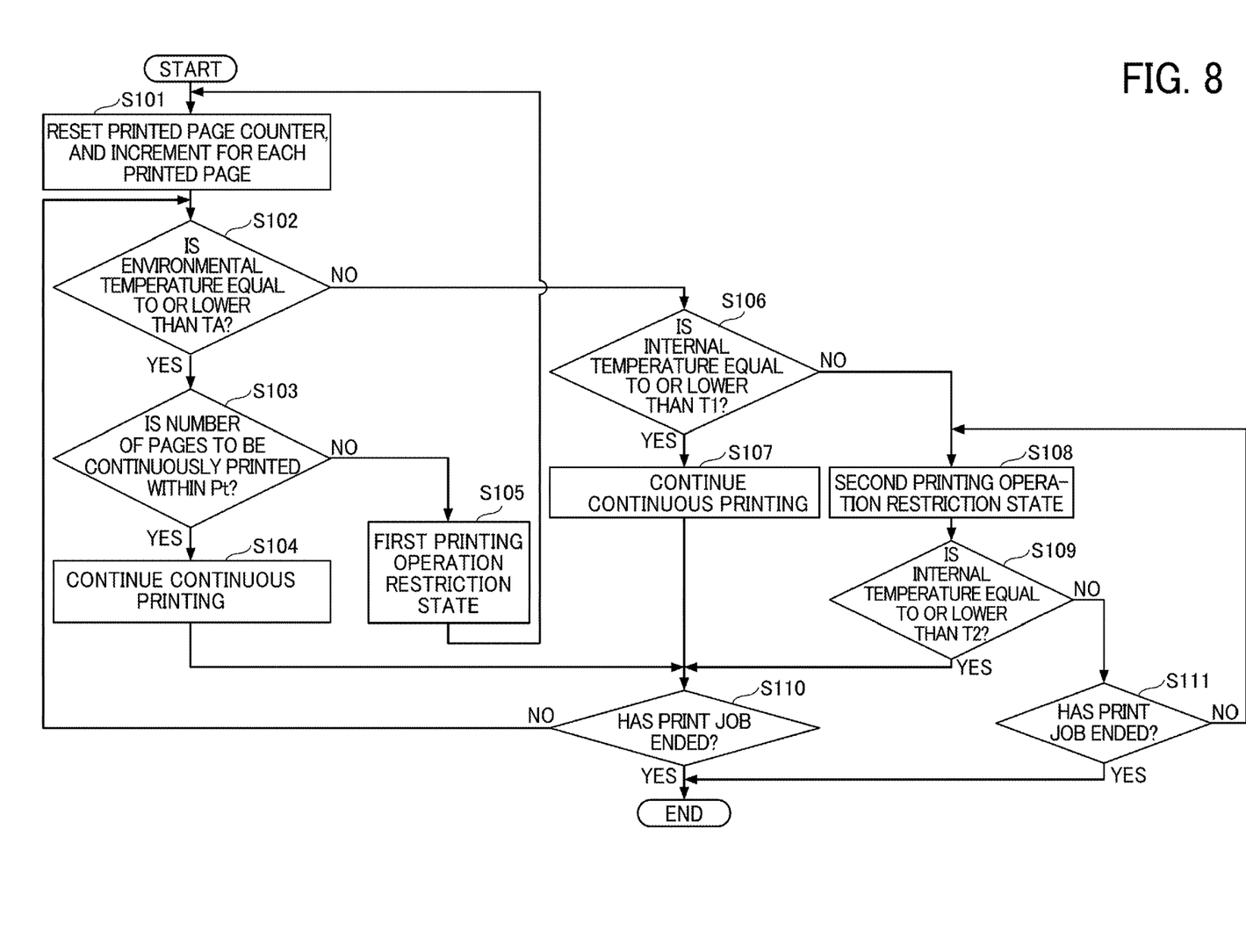
FIG. 8 is a flowchart of printing operation restriction mode control of this embodiment.

FIG. 8 is a flowchart of the printing operation restriction mode control of this embodiment. In FIG. 8, the number of pages to be continuously printed is applied as the work amount of the image forming device 20 detected by the work amount detector 73. A case where the 30° C. environment is applied as the high temperature environment, the 28° C. environment is applied as the low temperature environment, and environmental temperature threshold TA is 29° C. is exemplified. A series of processes of the flowchart illustrated in FIG. 8 is performed by the circuitry.

At step S101, when the printing operation is started, a printed page counter is reset, and the counter is incremented for each printed page.

At step S102, the printing operation restriction state to be performed is selected according to the environmental temperature. Specifically, it is determined whether the environmental temperature is equal to or lower than predetermined environmental temperature threshold TA. In this example, environmental temperature threshold TA=29° C. is set. In a case where the environmental temperature is equal to or lower than TA ("Yes" at S102), it is in the 28° C. environment (low temperature environment), so that the procedure shifts to S103 to determine whether to shift to the first printing operation restriction state. In a case where the environmental temperature is equal to or higher than TA ("No" at S102), it is in the 30° C. environment (high temperature environment), so that the procedure shifts to S106 to determine whether to shift to the second printing operation restriction state.

At step S103, it is determined whether the number of pages to be continuously printed is within a predetermined number of pages Pt. The control section 70 refers to, for example, the printed page counter mentioned at step S101 to detect the number of pages to be continuously printed. In a case where the number of pages to be continuously printed is equal to or smaller than a predetermined number of pages Pt ("Yes" at S103), the procedure shifts to step S104, and continuous printing is continued. In a case where the number of pages to be continuously printed is larger than the predetermined number of pages Pt ("NO" at S103), the procedure shifts to step S105, and the first printing operation restriction state is executed. The predetermined number of pages Pt corresponds to the "work amount threshold", and in a case where Pt=600 pages is set and an execution time of the first printing operation restriction state is set to 30 seconds, for example, a pause of 30 seconds is executed for every 600 pages in the continuous printing state.

When the process at step S104 is completed, the procedure shifts to step S110. When the process at step S105 is completed, the procedure returns to step S101.

In an environment in which TA is higher than 29° C., the shift to the second printing operation restriction state is determined at S106. Specifically, it is determined whether the internal temperature is equal to or lower than the predetermined first threshold T1. The control section 70 uses temperature information input from the internal temperature sensor 72 as the internal temperature. In this example, the first threshold T1 is set to 40° C. In a case where the internal temperature exceeds T1=40° C. ("NO" at step S106), the procedure shifts to step S108 to shift to the second printing operation restriction state, and this is continued until the internal temperature falls to be equal to or lower than the second threshold T2 (for example, set to 39° C. lower than the first threshold) ("YES" at step S109).

In a case where the internal temperature is equal to or lower than the first threshold T1 ("Yes" at step S106), the procedure shifts to step S107 and the continuous printing is continued. After continuous printing processing at step S104 and step S107, or in a case where the internal temperature becomes equal to or lower than the second threshold T2 in the second printing operation restriction state at step S109 ("Yes" at step S109), it is determined whether a print job is completed at step S110. In a case where the print job is completed ("YES" at S110), the printing operation is finished. In a case where the print job is not completed ("NO" at S110), the procedure returns to step S102.

Similarly, in a case where the internal temperature becomes higher than the second threshold T2 in the second printing operation restriction state at step S109 ("NO" at S109), it is determined whether the print job is completed at step S111. In a case where the print job is completed ("YES" at S111), the printing operation is finished. In a case where the print job is not completed ("NO" at S111), the procedure returns to step S108.

The number of printable sheets per unit time in the first printing operation restriction state is larger than the number of printable sheets per unit time in the second printing operation restriction state. In this manner, the switching of the printing operation restriction state according to the environment may be performed, so that the rise in internal temperature and optimization of the productivity are implemented.

As described above, the information regarding the work amount of the image forming device 20 detected by the work amount detector 73 may be other than the number of pages to be continuously printed. For example, information such as a continuous operation time of the driving device 74 that drives the image forming unit (image forming device 20) and a travel distance of the image forming unit may be used. In this case, similar control may be performed by replacing "printed page" at steps S101 and S103 in FIG. 8 with "continuous operation time (for example, 10 minutes)" or "travel distance".

Figure 9:
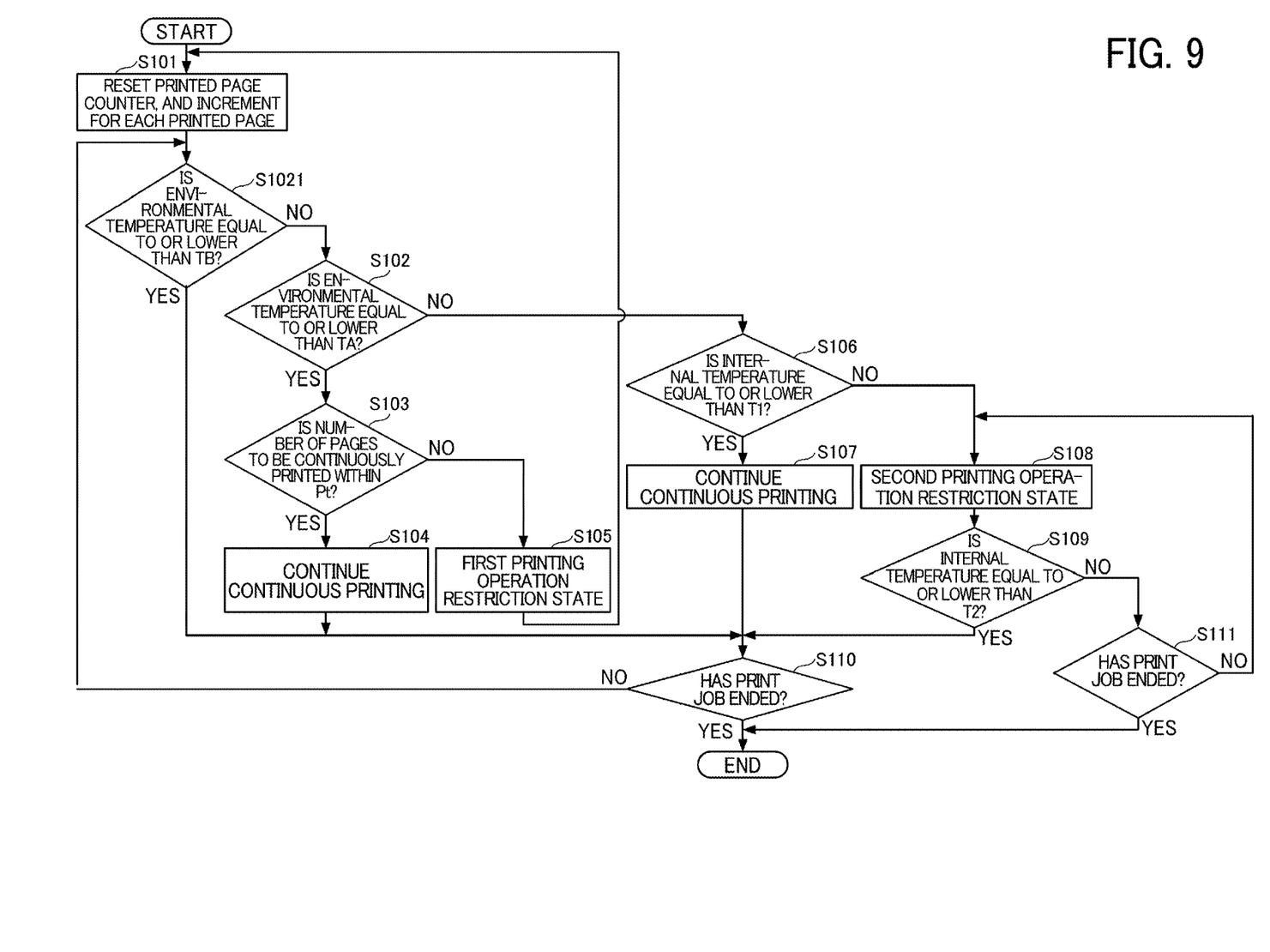
FIG. 9 is a first variation of the flowchart of the printing operation restriction mode control.

FIG. 9 illustrates a first variation of the flowchart of the printing operation restriction mode control.

In the flowchart in FIG. 9, determination as to whether the environmental temperature is equal to or lower than a predetermined lower limit value TB is added as step S1021 between steps S101 and S102 of the flowchart in FIG. 8. Lower limit value TB is set to a value lower than environmental temperature threshold TA, which is a determination index for switching the printing operation restriction mode (refer to FIG. 7).

In a case where the environmental temperature is equal to or lower than the lower limit value TB ("Yes" at S1021), the procedure shifts to step S110, and the switching determination of the printing operation restriction mode at step S102 is not performed. In a case where the environmental temperature is higher than the lower limit value TB ("NO" at S1021), the procedure shifts to step S102.

That is, in the flowchart in FIG. 9, even in a case where the temperature detected by the external temperature sensor 71 is lower than environmental temperature threshold TA, the control section 70 does not shift to the first printing operation restriction state in a case where the temperature detected by the external temperature sensor 71 is lower than predetermined lower limit value TB lower than environmental temperature threshold TA.

In a case where the environmental temperature is sufficiently low, image forming device temperature does not exceed Td (=45° C.) even if the continuous printing is performed for a long time. Therefore, in this situation, there is no need to perform the first printing operation restriction. By setting lower limit value TB of the environmental temperature and performing the first printing operation restriction only when the environmental temperature is between environmental temperature threshold TA and lower limit value TB, it is possible to more effectively prevent deterioration in productivity.

In summary, in the processing of the flowchart in FIG. 9, allocation of the printing operation restriction according to the environmental temperature is as follows.

(1) Environmental temperature T<TB: Printing operation restriction is not performed in any case.

(2) TB≤T<TA: First printing operation restriction is performed if condition is satisfied.

(3) TA≤T: Second printing operation restriction is performed if condition is satisfied.

Figure 10:
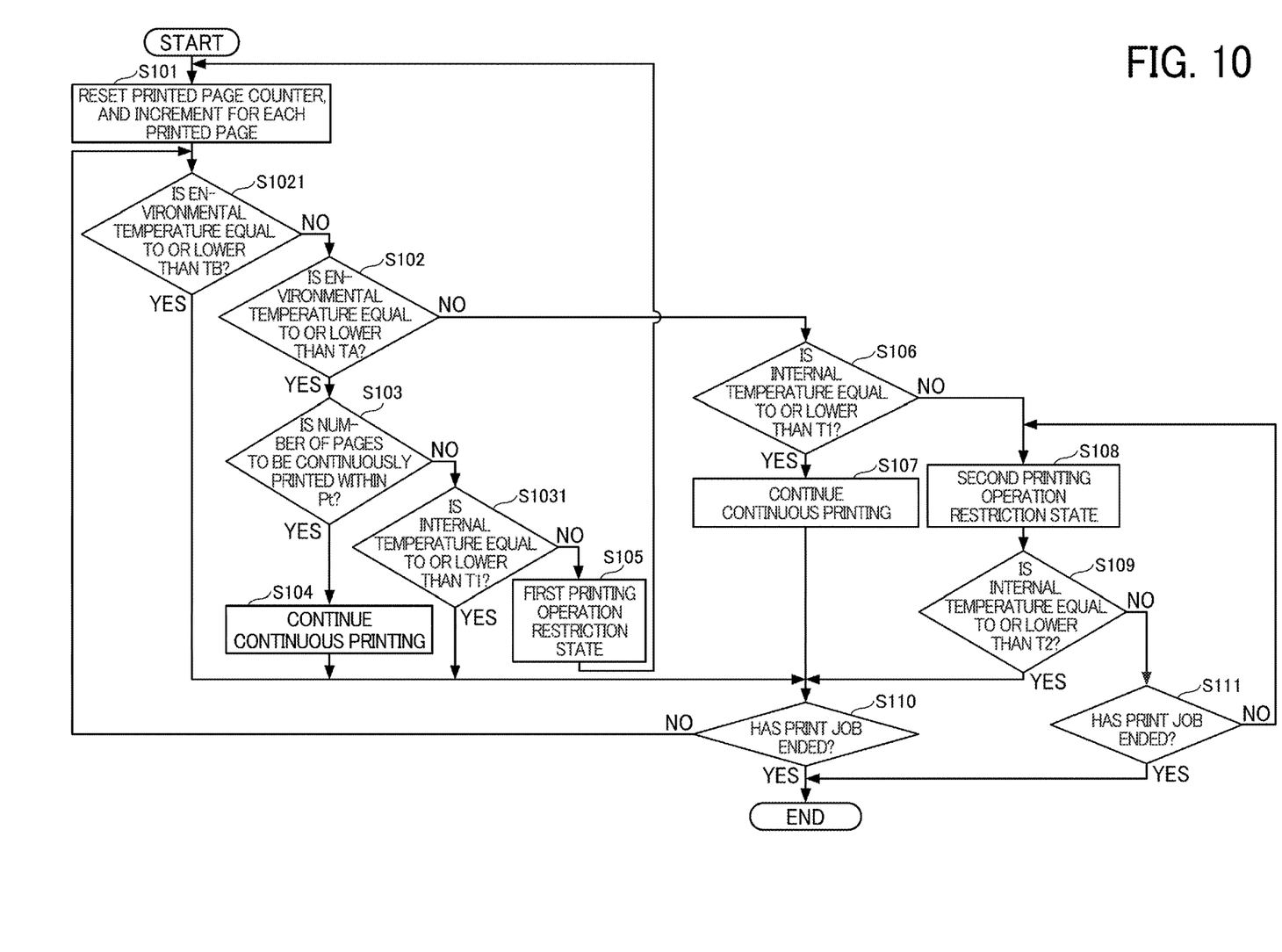
FIG. 10 is a second variation of the flowchart of the printing operation restriction mode control.

FIG. 10 illustrates a second variation of the flowchart of the printing operation restriction mode control.

In the flowchart in FIG. 10, determination as to whether the internal temperature is equal to or lower than the predetermined first threshold T1 is added as step S1031 between steps S103 and S105 of the flowcharts in FIGS. 8 and 9. The set value of the first threshold T1 is similar to that at step S106.

In a case where the internal temperature is equal to or lower than the first threshold T1 ("Yes" at S1031), the procedure shifts to step S110, and the first printing operation restriction mode at step S105 is not executed. In a case where the internal temperature is higher than the first threshold T1 ("NO" at S1031), the procedure shifts to step S105.

That is, in the flowchart in FIG. 10, even in a case where the temperature detected by the external temperature sensor 71 is lower than environmental temperature threshold TA, the control section 70 does not shift to the first printing operation restriction state in a case where the internal temperature detected by the internal temperature sensor 72 is equal to or lower than the first threshold T1.

In the processing of the flowcharts in FIGS. 8 and 9, when outside air temperature is between TB and TA, the first printing operation restriction occurs every 600 pages. Since it is sufficient that the image forming device temperature does not exceed target Td, it is not necessary to activate the printing operation restriction from an initial stage of the continuous printing in which the internal temperature is low. Therefore, in the flowchart in FIG. 10, by adding the determination at step S1031, the first printing operation restriction is performed only when the internal temperature is high by adding the restriction of the internal temperature. This makes it possible to more effectively prevent deterioration in productivity.

This embodiment is described above with reference to specific examples. However, the present disclosure is not limited to these specific examples. Design changes appropriately made by those skilled in the art to these specific examples are also included in the scope of the present disclosure as long as the changes have the features of the present disclosure. Each element included in each of the above-described specific examples and arrangement, conditions, and a shape of the element are not limited to those exemplified, and may be appropriately changed. The respective elements included in each of the above-described specific examples may be appropriately combined differently as long as no technical contradiction occurs.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus comprising:
an image forming device configured to form an image;
a driving device configured to drive the image forming device;
an external temperature detector configured to detect an external temperature of the image forming apparatus;
an internal temperature detector configured to detect an internal temperature of the image forming apparatus;
a work amount detector configured to detect a work amount of the image forming device; and
control circuitry configured to control an operation of the driving device,
wherein the control circuitry is configured to, in a case where the temperature detected by the external temperature detector is lower than an environmental temperature threshold, shift to a first printing operation restriction state based on the work amount detected by the work amount detector, the first printing operation restriction state in which the control circuitry temporarily stops drive of the image forming device by the driving device for a predetermined period every time the work amount reaches a work amount threshold, and
wherein the control circuitry is configured to, in a case where the temperature detected by the external temperature detector is equal to or higher than the environmental temperature threshold, shift to a second printing operation restriction state based on the internal temperature detected by the internal temperature detector, the second printing operation restriction state in which, in a case where the internal temperature is higher than a first threshold, the control circuitry performs an intermittent operation of repeating a pause state in which the drive of the image forming device by the driving device is stopped and a printing state in which the image forming device is driven, until the internal temperature falls to be equal to or lower than a second threshold being lower than the first threshold.

2. The image forming apparatus according to claim 1, wherein the work amount includes a number of pages to be continuously printed by the image forming device.

3. The image forming apparatus according to claim 1, wherein the work amount includes a continuous operation time of the driving device.

4. The image forming apparatus according to claim 1, wherein a number of printable sheets per unit time in the first printing operation restriction state is larger than a number of printable sheets per unit time in the second printing operation restriction state.

5. The image forming apparatus according to claim 1, wherein even in a case where the temperature detected by the external temperature detector is lower than the environmental temperature threshold, the control circuitry does not shift to the first printing operation restriction state in a case where the temperature detected by the external temperature detector is lower than a lower limit value being lower than the environmental temperature threshold.

6. The image forming apparatus according to claim 1, wherein even in a case where the temperature detected by the external temperature detector is lower than the environmental temperature threshold, the control circuitry does not shift to the first printing operation restriction state in a case where the internal temperature detected by the internal temperature detector is equal to or lower than the first threshold.

* * * * *